(12) United States Patent
Ikeda et al.

(10) Patent No.: US 7,762,694 B2
(45) Date of Patent: Jul. 27, 2010

(54) LIGHTING DEVICE FOR VEHICLE AND METHOD OF MANUFACTURING THE SAME

(75) Inventors: Toshimasa Ikeda, Shizuoka (JP); Takahiro Kohata, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 326 days.

(21) Appl. No.: 11/854,598

(22) Filed: Sep. 13, 2007

(65) Prior Publication Data

US 2008/0063862 A1 Mar. 13, 2008

(30) Foreign Application Priority Data

Sep. 13, 2006 (JP) ............... 2006-247590

(51) Int. Cl.
*F21V 7/22* (2006.01)
(52) U.S. Cl. .................. 362/348; 362/296.01; 362/297; 362/349; 362/516
(58) Field of Classification Search ................. 362/516, 362/296, 348, 349, 297
See application file for complete search history.

(56) References Cited

U.S. PATENT DOCUMENTS

| | | | |
|---|---|---|---|
| 5,760,159 | A | 6/1998 | Parramon et al. |
| 2004/0170847 | A1 | 9/2004 | Lefevre et al. |
| 2006/0062009 | A1 | 3/2006 | Ono et al. |

FOREIGN PATENT DOCUMENTS

| | | | |
|---|---|---|---|
| DE | 103 38 840 A1 | | 1/2006 |
| JP | 4-368702 A | | 12/1992 |
| JP | 8-264013 A | | 10/1996 |
| JP | 2002-60600 A | | 2/2002 |
| WO | 2005/019344 A1 | | 3/2005 |

OTHER PUBLICATIONS

English translation of Dirks (DE 103 38 840 A1).*
Chinese Office Action dated Sep. 12, 2008.
Extended European Search Report dated Jan. 15, 2009.

* cited by examiner

*Primary Examiner*—Sandra L O'Shea
*Assistant Examiner*—Leah S Lovell
(74) *Attorney, Agent, or Firm*—Sughrue Mion, PLLC (57) ABSTRACT

In a lighting device for a vehicle including a reflector in which an aluminum deposited layer is formed on a surface of a resin member, the resin member is molded through a resin obtained by adding, to a crystalline resin, a filler having a size smaller than a wavelength of a visible light, and a smooth surface and a fine concavo-convex surface are mixed into a surface of the reflector (the resin member) which is molded. The aluminum deposited layer is directly deposited on the surface of the resin, and the smooth surface is formed as a mirror finished surface and the fine concavo-convex surface is formed as a semiglossy surface. As compared with a case in which the reflector is constituted by only the simple mirror finished surface, the semiglossy surface designed to have a proper area is present so that a sense of gloss can be suppressed as a whole and a sense of high quality can be given.

10 Claims, 5 Drawing Sheets

LIGHTING DEVICE FOR VEHICLE AND METHOD OF MANUFACTURING THE SAME

This application claims priority to Japanese Patent Application No. 2006-247590, filed Sep. 13, 2006, in the Japanese Patent Office. The priority application is incorporated by reference in its entirety.

TECHNICAL FIELD

The present disclosure relates to a lighting device for a vehicle comprising a reflector or a dummy reflector, and more particularly to a lighting device for a vehicle in which a design effect of a reflector surface is enhanced and a method of manufacturing the lighting device for a vehicle.

RELATED ART

In a lamp for a vehicle, there has been used a technique for forming, through resin molding, a reflector for reflecting a light emitted from a light source to obtain a predetermined light distributing characteristic and a dummy reflector (hereinafter referred to as an extension) for hiding a clearance between the reflector and a lamp body, and forming an aluminum deposited layer on the surface to form a mirror finished surface. This is intended for an object of a design that the reflector is constituted as a reflecting plane, and furthermore, a sense of gloss is given to the extension observed from an outside through a front cover of the lamp to have a sense of integration with the reflector. In a reflector and an extension according to the related art, polyester, polypropylene or polyphenylene sulfide is used for a resin material. However, concavo-convex portions are easily generated on a surface of a molded resin. A surface of the aluminum deposited layer formed on the surface has a low regular reflectance and it is hard to obtain a mirror finished surface. For this reason, there has been used in the related art a technique for applying an undercoat onto the surface of the resin to smooth the surface and forming the aluminum deposited layer on the surface of the undercoat.

In the technique for forming the undercoat and forming the aluminum deposited layer thereon, a labor and cost for forming the undercoat is required, which is an obstacle to a reduction in cost of a lamp. In recent years, therefore, there has been proposed a technique for forming an aluminum deposited layer through so-called direct deposition in which a smoothness of a surface of a molded resin is enhanced to directly form the aluminum deposited layer on the surface of the molded resin. For example, it is possible to enhance the smoothness of the surface by using polycarbonate for a resin material. Even if the undercoat is not formed, therefore, the smoothness of the surface of the aluminum deposited layer can be enhanced and a regular reflectance of a light can be improved to form a mirror finished surface. In Japanese Patent Unexamined Publication No. 8-264013, moreover, there has been proposed a technique for smoothing a surface of a resin molded by characterizing an amount of addition of talc or barium sulfate acting as a filler to be added to polypropylene and directly depositing aluminum on the surface of the molded resin, thereby obtaining a mirror finished surface. On the other hand, Japanese Patent Unexamined Publication No. 2002-60600 has also proposed a technique for characterizing a size and number of particles of an inorganic particle containing a polyester resin composition, particularly, a layered compound in order to improve a moldability of a resin and to enhance a flatness of the surface.

In recent years, in a lamp for a vehicle, it has been supposed that a region other than an effective reflecting plane of a reflector for reflecting a light emitted from a light source and a surface of an extension are set to be a semiglossy surface such as a reflecting plane having a low regular reflectance or a diffusing and reflecting plane to improve a design beauty of the lamp and to obtain a sense of high quality in the lamp. As one of the measures, it is supposed that fine concavo-convex portions are formed on a resin surface in a region corresponding to a non-effective reflecting plane of a resin to be a main body of the reflector and the extension and an aluminum deposited layer is formed thereon to intentionally form a fine concave-convex surface, that is, a so-called embossed surface on the surface of the aluminum deposited layer and to irregularly reflect or to diffuse and reflect a light over the embossed surface. Herein, a surface such as the embossed surface will be referred to as a semiglossy surface. Thus, a semiglossy surface having a predetermined pattern is mixed into a partial region of the mirror finished surfaces of the reflector and the extension. Consequently, a sense of gloss of the reflector and the extension is suppressed so that a designing property can be enhanced and a sense of high quality can be obtained.

In order to implement the semiglossy surface, it is necessary to form a smooth surface on the surface of the resin when carrying out resin molding over the reflector or the extension, and at the same time, to selectively form fine concavo-convex portions on a part of the surface. The polycarbonate is a non-crystalline resin. For this reason, a viscosity in melting is high and the resin does not enter the fine concavo-convex portions formed in the metal mold so that the fine concavo-convex portions cannot be formed on the surface. This is the same for the polypropylene according to JP8-264013. Therefore, there has been taken in the related art a step of molding the resin from which the smoothness is obtained on the surface and then carrying out a shot peening treatment over a part of the surface to form a fine concavo-convex surface, and forming an aluminum deposited layer on the surface, for example. Alternatively, there is taken a step of polishing and smoothing a part of the surface of the resin on which the fine concavo-convex portions are formed and forming the aluminum deposited layer. In the latter method, it is very hard to polish the surface flatly. Actually, the latter method is almost impossible. For this reason, the former method is taken. In the technique for processing the fine concavo-convex surface in only a part of the surface of the molded resin, however, it is necessary to carry out a step of forming a mask for exposing only a part of the surface by utilizing a photography and carrying out a fine concavo-convex processing over the surface, and removing the mask after ending the processing. Thus, the number of steps is increased. Thus, it is hard to implement a reduction in cost.

Moreover, the resin according to JP2002-60600 is not assumed to be applied to the technique for forming the aluminum deposited layer on the surface to form the glossy surface or the semiglossy film as in JP8-264013. In some cases in which the aluminum deposited layer is actually formed on the surface by direct deposition, therefore, concavo-convex portions are generated on the surface depending on a shrinkage difference in a reduction in temperatures of the resin which is molded and deposited and the aluminum deposited layer so that a regular reflectance is reduced and a mirror finished surface cannot be obtained. For this reason, it is supposed that an application to a lamp for a vehicle is hard. In Japanese Patent Unexamined Publication No. 4-368702, moreover, there has been proposed a technique for carrying out knurling over an extension to diffuse a light emitted from a light source, thereby diffusing a light irradiated on a region other than an effective reflecting plane to reduce a dazzling light. A surface subjected to the knurling is not a semiglossy surface. For this reason, it is hard to obtain the advantage for enhancing a designing property and the sense of high quality. Furthermore, it is also possible to suppose that a coating material having a low reflectance is applied to reduce a light reflectance in the region other than the effective reflecting plane. However, there is a problem in that a special step for coating is required, resulting in an increase in cost.

SUMMARY

Exemplary embodiments of the present invention provide a lighting device for a vehicle which can obtain a sense of high quality on a design basis by mixing a mirror finished surface and a semiglossy surface into a surface of a component such as a reflector or an extension, and a manufacturing method capable of easily manufacturing the lighting device for a vehicle.

An aspect of the present invention provides a lighting device for a vehicle which comprises a component of the lighting device in which an aluminum deposited layer is formed on a surface of a resin member, wherein the resin member is molded by a resin obtained by adding, to a crystalline resin, a filler having a size smaller than a wavelength of a visible light, a smooth surface and a fine concavo-convex surface are mixed into the surface of the resin member which is molded, the aluminum deposited layer is directly deposited on the surface of the resin member, and the smooth surface is formed as a mirror finished surface and the fine concavo-convex surface is formed as a semiglossy surface. For example, there is employed a structure in which a component of a lighting device is a reflector or an extension provided in a lighting device body, and at least an effective reflecting plane of the reflector is formed by a mirror finished surface and a semiglossy surface is provided in a residual region of the reflector or at least a part of the extension.

Another aspect of the present invention provides a lighting device for a vehicle which comprises a component including a resin member and an aluminum deposited layer directly formed on a surface of the resin member, wherein the resin member is formed by a crystalline resin with a filler, the filler having a size smaller than a wavelength of a visible light, and the resin member has a smooth surface and a fine concavo-convex surface, wherein the component has a mirror finished surface formed on the smooth surface of the resin member, and a semiglossy surface formed on the fine concavo-convex surface of the resin member. For example, the fine concavo-convex surface of the resin member has a concavo-convex height of 5 to 10 μm.

Another aspect of the present invention provides a method of manufacturing a lighting device for a vehicle including a component of the lighting device in which an aluminum deposited layer is formed on a surface of a resin member, comprising the steps of molding a resin member in which at least a part of a surface is a smooth surface and at least a part of the other portion has a fine concave-convex surface through a resin obtained by adding, to a crystalline resin, a filter having a size smaller than a wavelength of a visible light, and directly forming an aluminum deposited layer on the surface of the resin member. The fine concavo-convex surface of the resin member is formed to have a concavo-convex height of 5 to 10 μm.

One or more exemplary embodiments of the present invention may include one or more of the following advantages For example; according to the lighting device for a vehicle in accordance with an exemplary embodiment of the present invention, the semiglossy surface is formed in a predetermined pattern on a part of the mirror finished surface over the surface of the component of the lighting device such as a reflector or an extension, and the mirror finished surface and the semiglossy surface are observed from the outside of the lighting device. As compared with the case in which the component of the lighting device is constituted by only a simple mirror finished surface, therefore, a sense of gloss is suppressed as a whole by the presence of the semiglossy surface designed in a proper area. Thus, it is possible to give a sense of high quality when viewing the lighting device in non-lighting.

According to the manufacturing method in accordance with the present invention, moreover, it is possible to form, as a mirror finished surface, a surface of apart of the components of the lighting device and to form a surface of a part of the other components as a semiglossy surface by simply molding the components of the lighting device with a resin and then forming the aluminum deposited layer on the surface through direct deposition. Therefore, there is not required a step of smoothing a part of the surface after carrying out molding as in the related art and a step of forming concavo-convex portions on a part of the surface. Thus, it is possible to manufacture a lighting device requiring a lower cost and labor requirements.

Other features and advantages may be apparent from the following detailed description, the accompanying drawings and the claims.

DETAILED DESCRIPTION

FIRST EXAMPLE

Figure 1:
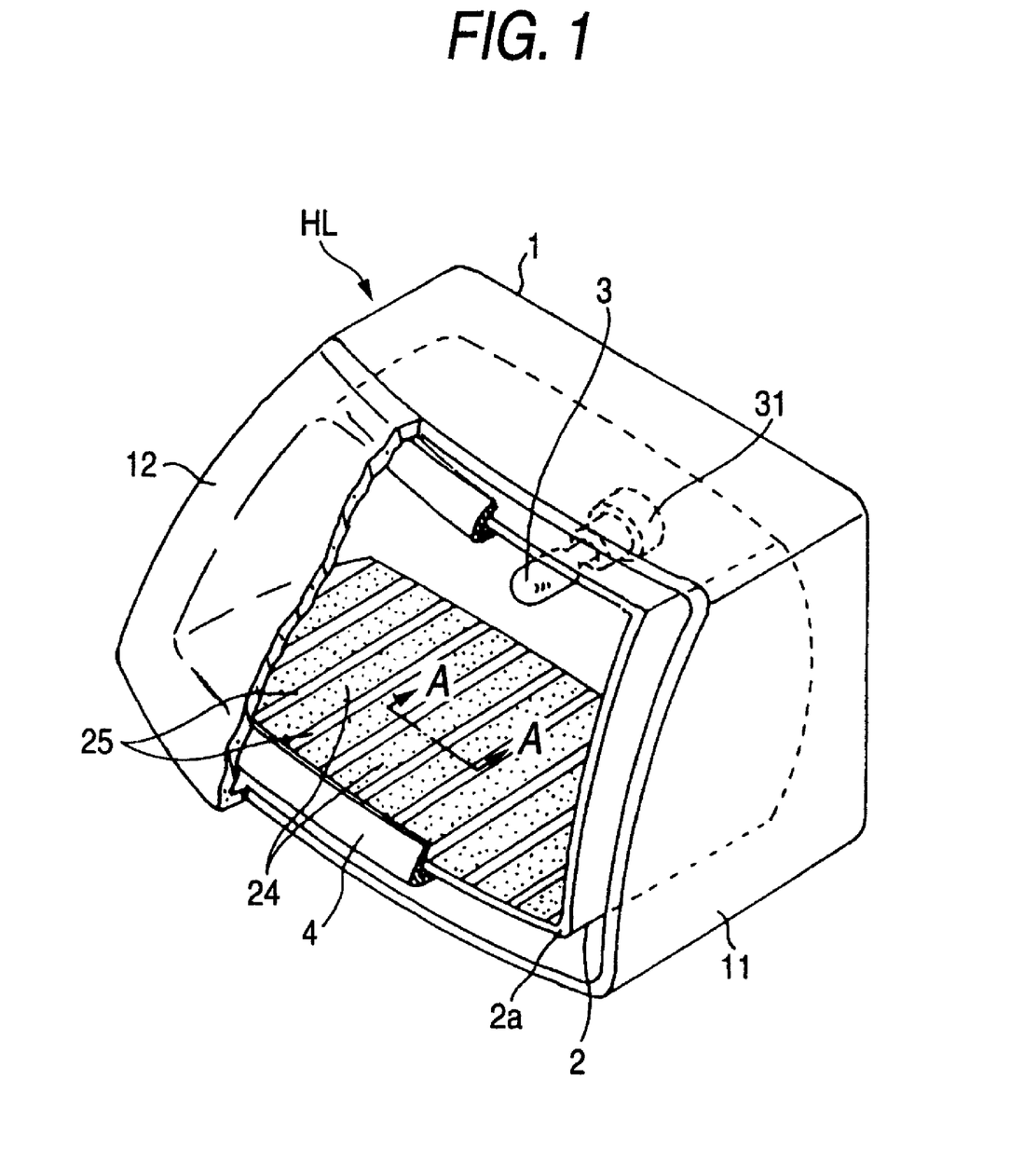
FIG. 1 is a schematic perspective view showing a headlamp according to a first exemplary embodiment, a part of which is cut away.
Figure 2:
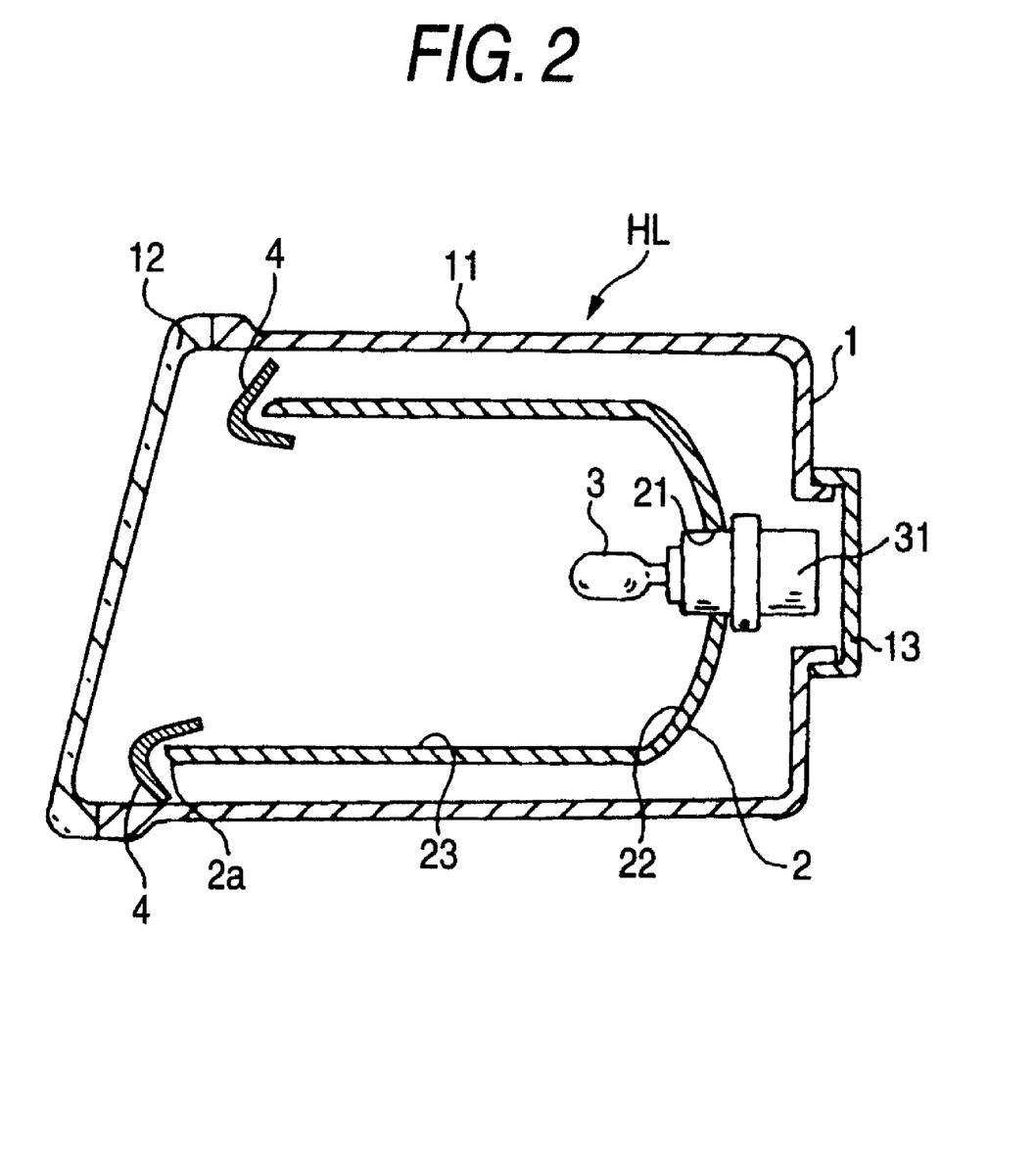
FIG. 2 is a longitudinal sectional view showing the headlamp according to the first exemplary embodiment.

Next, a first exemplary embodiment of the present invention will be described with reference to the drawings. FIG. 1 is a perspective view showing the first exemplary embodiment of a headlamp HL for a vehicle, a part of which is cut away, and FIG. 2 is a longitudinal sectional view showing the same. In the drawings, a lamp housing 1 is constituted by a lamp body 11 taking a front shape which is close to a rectangular shape, a front lens 12 attached to a front opening of the lamp body 11 and formed by a transparent resin, a back cover 13 for covering a back opening of the lamp body 11, and a reflector 2 is provided in the lamp housing 1. A bulb attaching hole 21 is formed on a back face of the reflector 2 and an incandescent bulb or a discharge bulb 3 to be a light source is attached by means of a bulb socket 31. The reflector 2 can be tilted vertically and transversely by means of an aiming mechanism which is not shown. Consequently, positions of central optical axes of the light source 3 and the reflector 2 can be deflected and regulated. Moreover, an extension 4 taking a shape of an almost rectangular frame seen from a front is provided to hide a clearance generated between a front opening peripheral edge portion 2a of the reflector 2 and an internal surface of the lamp body 11, and is fixed and supported in the lamp body 1 in such a state as to be separated from the reflector 2 in order not to damage an aiming operation of the reflector 2. In the first exemplary embodiment, the reflector 2 and the extension 4 are components of the lighting device.

The reflector 2 has an effective reflecting plane 22 to be a rotating paraboloid and a non-effective reflecting plane 23 taking a shape of an almost rectangular cylinder which is constituted by a vertical plane extended forward from a periphery of the effective reflecting plane 22 and a transverse surface. Most of a light emitted from the light source 3 is reflected by the effective reflecting plane 22 and is refracted and collected by the front lens 12 so that a light is irradiated in a predetermined light distribution pattern in a forward direction of a vehicle. Moreover, a part of the light emitted from the light source 3 is projected onto the non-effective reflecting plane 23. The light to be reflected is emitted through the front lens 12. Herein, the same light is reflected in such a direction as not to daze a vehicle running on an opposing lane or a pedestrian. In the reflector 2, an aluminum deposited layer is formed through direct deposition on a surface of a resin member obtained by molding a resin, and the effective reflecting plane 22 is formed as a mirror finished surface (a glossy surface) by the aluminum deposited layer and most of the non-effective reflecting plane 23 is formed as a mirror finished surface. As shown in FIG. 1, a part of the non-effective reflecting plane 23, that is, a lower surface is provided with semiglossy surfaces 24 in a grid-like pattern in which a mirror finished surface 25 having a minute interval in a transverse direction is disposed therebetween when the headlamp HL is seen from a front. The semiglossy surface 24 is constituted by a band-shaped embossed surface. In the band-shaped embossed surface, a plurality of fine concave-convex grooves taking straight shapes is disposed in a transverse line at a fine interval as will be described below. Moreover, the extension 4 is obtained by molding a resin material to take a shape of an almost rectangular frame and forming an aluminum deposited layer as a mirror finished surface on a surface through direct deposition. The semiglossy surface is not formed on the extension 4.

Referring to the reflector 2 and the extension 4, the aluminum deposited layer is formed through direct deposition on the surface of the molded resin member in the same manner. Therefore, description will be given to an example of the reflector 2. In the reflector 2, polybutylene terephthalate referred to as a crystalline resin is used for a resin and magnesium sulfate ($MgSO_2$) or magnesium silicate ($MgSiO$) is contained as a filler (an additive material) therein. In the related art, this type of filler to be used has a size of 400 nm or more. In the first exemplary embodiment, however, the filler to be used has a size smaller than 400 nm. 400 nm is set to be a dimension smaller than the smallest wavelength of a visible light. In the first exemplary embodiment, a wavelength region of the visible light is set to be 400 nm to 800 nm. For this reason, a size smaller than 400 nm is set.

Figure 3A:
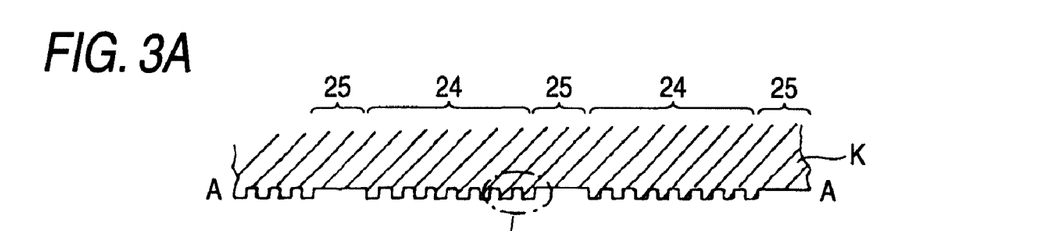
FIGS. 3A to 3C are views for explaining concavo-convex portions provided on surfaces of a metal mold and a resin.

The resin is molded as a resin member taking a shape of the reflector 2 by means of a metal mold. In this case, as shown in FIG. 3A which is a sectional view illustrating a metal mold K in a portion corresponding to an A-A line in FIGS. 1 and 3B which is an enlarged sectional view illustrating a part of the same portion, a molding surface of the metal mold K is formed in such a manner that a region corresponding to the mirror finished surface 25 of the reflector 2 is a smooth surface including a maximum concavo-convex portion having a size of 0.2 μm or less. Moreover, a fine concavo-convex groove Kg is formed on a surface in a region corresponding to the semiglossy surface 24. The fine concavo-convex groove has a height (a difference of elevation) of approximately 5 to 10 μm. Herein, a grid is formed by an array in which a predetermined number of fine concave-convex grooves including a rectangular section having a height of 5 μm are arranged in a direction of a width thereof, and the grid is arranged in a plurality of lines at a predetermined interval.

Figure 3B:
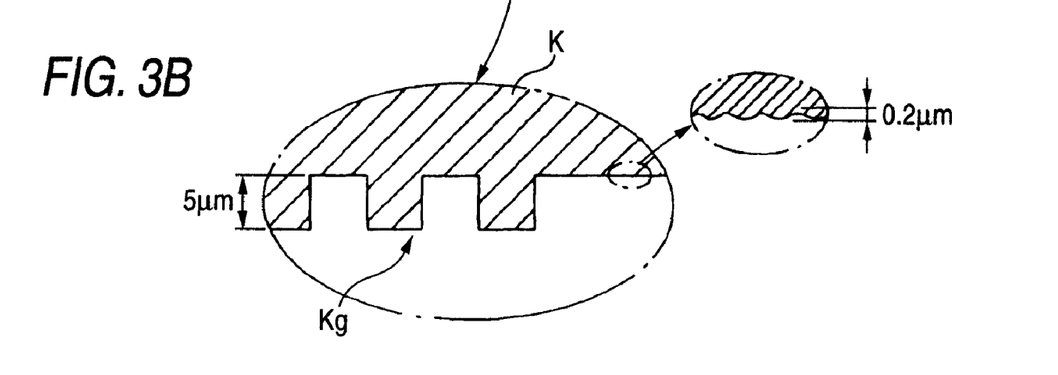
Figure 3C:
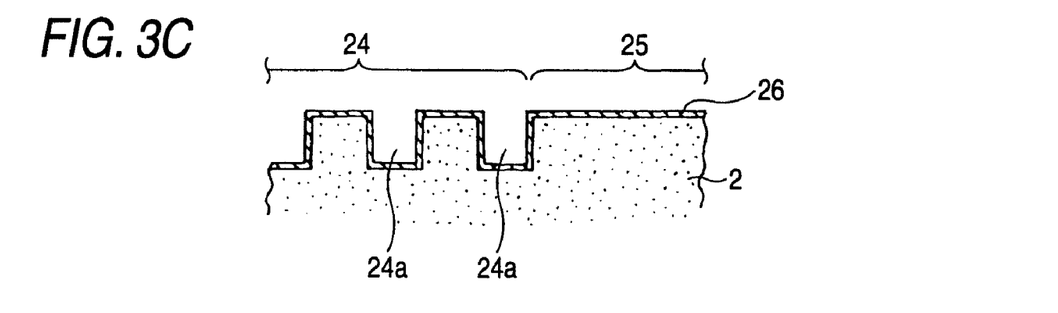

By molding the resin member using the metal mold K, a region corresponding to the mirror finished surface 25 of the reflector 2 is formed as a smooth surface including a maximum concavo-convex portion having a size of 0.2 μm or less as shown in a section of FIG. 3C. Moreover, a plurality of fine concavo-convex grooves 24a is arranged like a grid on a surface of a region corresponding to the semiglossy surface 24, and is formed as a so-called band-shaped embossed surface. In addition, an aluminum deposited layer 26 is formed through the direct deposition on the surface of the reflector 2, that is, surfaces to be the reflecting plane 22 and the non-reflecting plane 23. The direct deposition indicates a method of directly depositing aluminum without applying an undercoat onto the surface of the resin. The aluminum deposited layer 26 has a thickness of approximately 0.1 μm.

Figure 4A:
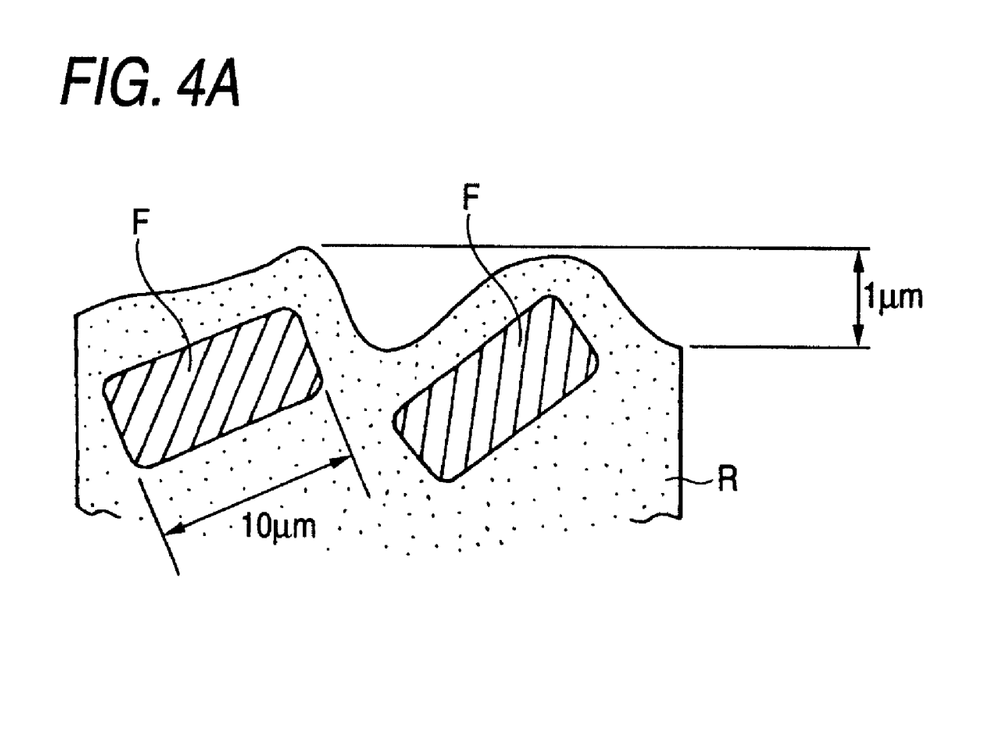
FIGS. 4A and 4B are typical views for explaining the concavo-convex portions provided on the surface through a resin and a filler.
Figure 4B:
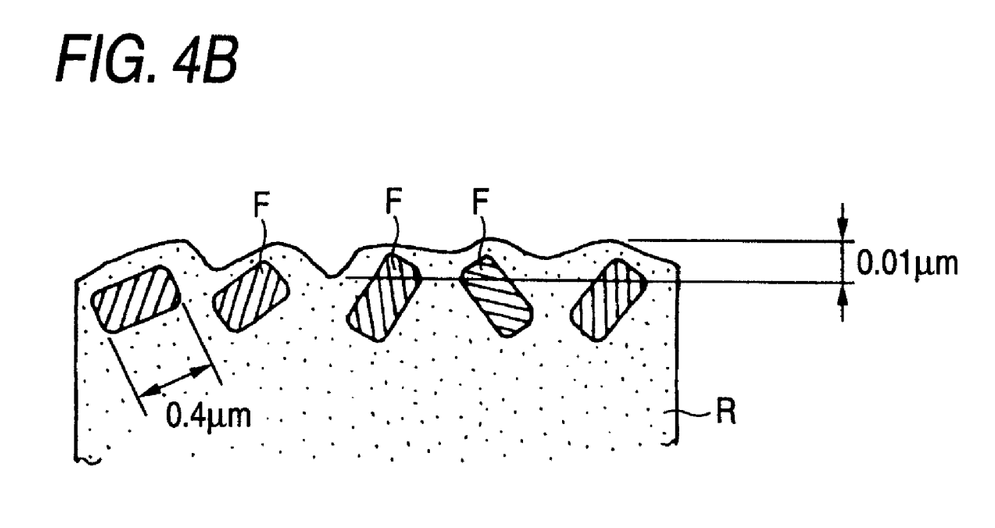

At this time, as shown in typical views of FIGS. 4A and 4B, a concavo-convex portion is generated on a surface of the molded resin member due to a shrinkage difference between a resin R and a filler F when a temperature is lowered. The concavo-convex portion is influenced by a size of the filler F contained in the resin R. As shown in FIG. 4A, the filler contained in the resin R has a great size of approximately 10 μm. Therefore, the concavo-convex portion provided on the surface has a size of approximately 1 μm. In the first exemplary embodiment, the filler contained in the resin R has a size smaller than 10 nm (0.01 μm). Consequently, the concavo-convex portion provided on the surface is 10 nm. When the aluminum deposited layer 26 is formed through the direct deposition on the surface of the molded resin R as shown in FIG. 3C, a wavelength of a visible light is equal to or greater than 400 nm and is greater than a height of the concavo-convex portion generated on the surface of the resin member R. Even if a concavo-convex portion having a size smaller than 400 nm is generated, the light is regularly reflected. In other words, in the region of the effective reflecting plane 22 of the reflector 2, the surface of the molded resin member is a smooth surface including a concavo-convex portion having a size of 10 nm or less. Therefore, the surface of the aluminum deposited layer 26 obtained through direct deposition is also smoothed and is formed as the mirror finished surface 25. If the filler has a size which is equal to or smaller than the wavelength of the visible light, that is, 400 nm, accordingly, the concavo-convex portion provided on the surface of the resin has a size of 400 nm or less. Therefore, it is possible to use the filler having the size of 400 nm or less.

On the other hand, a part of the non-effective reflecting plane 23 of the reflector 2 is formed as the mirror finished surface 25, and the other part is formed as a band-shaped embossed surface. The band-shaped embossed surface acts as the semiglossy surface 24 through the aluminum deposited layer 26. In the band-shaped embossed surface, as shown in FIG. 3C, the concavo-convex groove 24a has a height of 5 μm and the undercoat is not formed on the surface of the concavo-convex groove 24a. Therefore, the concave-convex groove 24a can be prevented from being filled with the undercoat. The aluminum deposited layer 26 has a thickness of 0.1 μm. Therefore, the height of the concave-convex groove 21a is rarely influenced and the surface of the aluminum deposited layer 26 becomes a fine concavo-convex surface. In addition, the height of 5 µm of the concavo-convex groove 24*a* is much greater as compared with the wavelength of the visible light. Therefore, the visible light is reflected irregularly so that the concavo-convex surface is not a mirror finished surface but a semiglossy surface.

Consequently, the non-effective reflecting plane 23 of the reflector 2 is provided with the grid-like pattern in which a plurality of wide semiglossy surfaces 24 is arranged with the thin mirror finished surface 25 interposed therebetween. The semiglossy surfaces 24 and the mirror finished surface 25 therebetween in the grid-like pattern are observed from the outside through the front lens 12 of the headlamp HL. Referring to the extension 4, a whole surface is formed as a mirror finished surface. When the headlamp HL is observed from a front side in non-lighting, accordingly, the reflector 2 which has a mirror finished surface in a most part and has the semiglossy surface 24 in the grid-like pattern in a part and the extension 4 having a whole surface to be the mirror finished surface are observed through the front lens 12. As compared with the case in which the reflector 2 and the extension 4 are constituted by only the simple mirror finished surfaces, consequently, the semiglossy surface 24 in the grid-like pattern which is designed to have a proper area is present in the mirror surface of the reflector 2 so that a sense of gloss in the whole reflector 2 can be suppressed and a sense of high quality can be obtained when the headlamp HL is seen in the non-lighting.

In the first exemplary embodiment, thus, by simply using the resin containing the filler having a size smaller than the wavelength of the visible light in the crystalline resin as the resin member constituting the reflector 2 and forming the aluminum deposited layer through direct deposition on the surface after molding the resin, it is possible to form a part of the surface as the mirror finished surface and the other part of the surface as the semiglossy surface. Consequently, it is possible to manufacture a reflector having an excellent designing property and to constitute a lamp having a sense of high quality. Therefore, there is not required a step of smoothing a part of the surface after carrying out molding as in the related art and a step of forming concavo-convex portions in a part of the surface. Consequently, it is possible to manufacture a lamp requiring low cost and labor.

SECOND EXAMPLE

Figure 5:
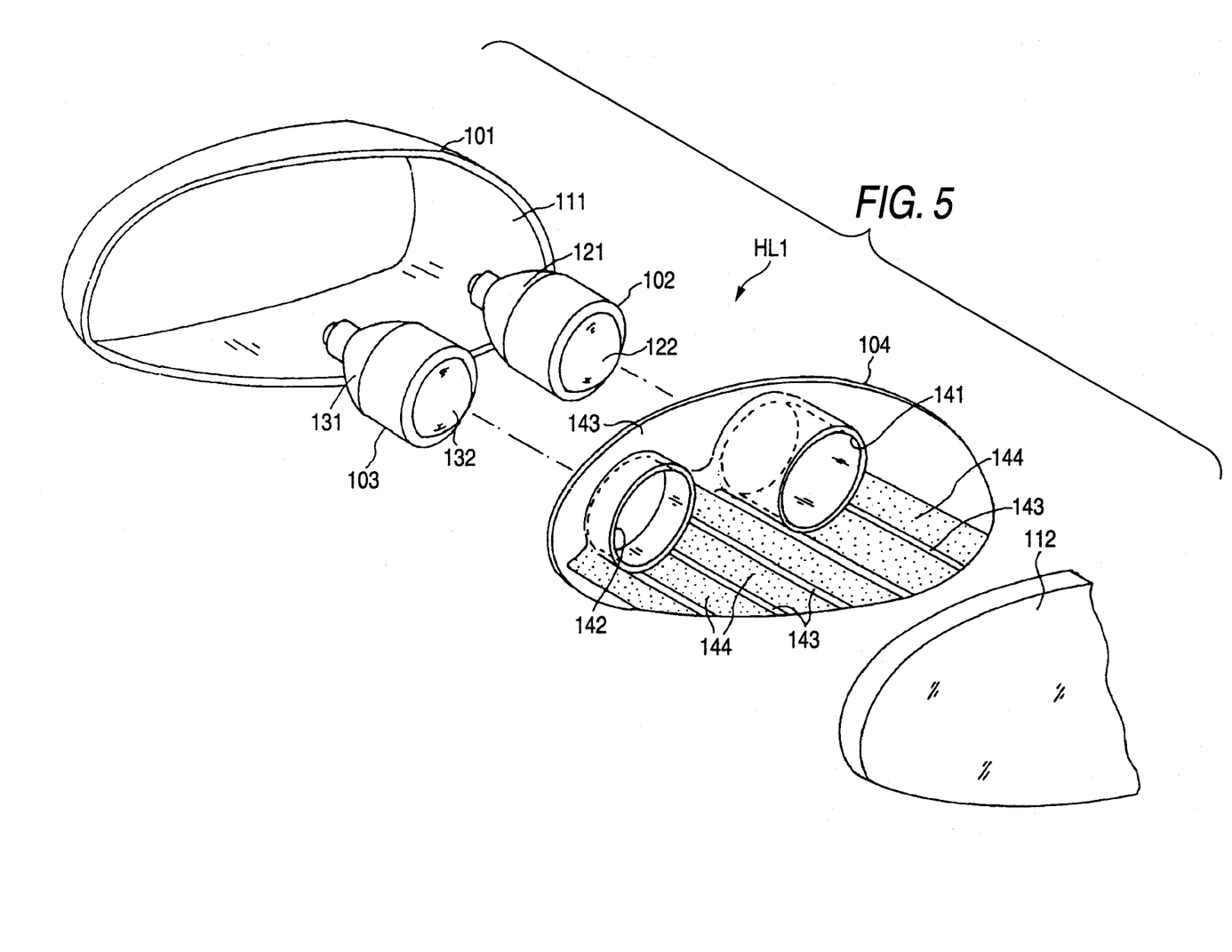
FIG. 5 is a partial exploded perspective view showing a headlamp according to a second exemplary embodiment.

FIG. 5 is a schematic partial exploded perspective view in which a lamp according to a second exemplary embodiment is applied to a headlamp HL1 for a vehicle. In the second exemplary embodiment, a so-called lamp of a projector type is constituted as the headlamp HL1 incorporated in a lamp housing. A lamp housing 101 is constituted by a lamp body 111 and a front cover 112, and a lamp 102 of a projector type for a high beam and a lamp 103 of a projector type for a low beam are transversely arranged and disposed in a state in which they are slightly shifted from each other in a longitudinal direction in the lamp housing 101. Since the structure of the lamp of the projector type has already been known, detailed description will be omitted. The lamp of the projector type serves to reflect a light emitted from a light source (not shown) provided in reflectors 121 and 131 disposed in a rear part by internal surfaces of the reflectors 121 and 131 and to collect the reflected light by lenses 122 and 132 provided in a front part, and to then emit the same light in a direction of an optical axis of the lamp. Moreover, an extension 104 is provided in order to hide the periphery of the lamps 102 and 103 of the projector type in the lamp housing 101. The extension 104 takes an external shape corresponding to a front opening of the lamp body 111 and has a middle zone part in which circular sleeve openings 141 and 142 taking almost cylindrical shapes and serving to accommodate the lamps 102 and 103 of the projector type are formed, and the lamps 102 and 103 of the projector type are inserted internally from rear parts of the sleeve openings 141 and 142 and the respective lenses 122 and 132 are exposed to a front side of the extension 104. Although most of a surface of the extension 104 is formed as a mirror finished surface 143, a front region of the sleeve openings 141 and 142 is provided with a semiglossy surface 144 having a grid-like pattern in which a plurality of semiglossy surfaces having small widths extended in the direction of the optical axis is arranged in a transverse direction.

In the same manner as the reflector according to the first exemplary embodiment, in the extension 104, polybutylene terephthalate to be a crystalline resin is used and is caused to contain magnesium sulfate ($MgSO_2$) or magnesium silicate (MgSiO) having a size smaller than 400 nm as a filler (an additive material) The resin is molded to form an extension by means of a metal mold subjected to a surface treatment in the same manner as in the first exemplary embodiment shown in FIGS. 3A-3C. At this time, in the molded extension, a region corresponding to the mirror finished surface is formed as a smooth surface having a maximum concavo-convex portion of 0.2 µm or less, and a region corresponding to the semiglossy surface has a surface provided with fine band-shaped concavo-convex portions which are constituted by a large number of concavo-convex grooves taking a rectangular section having a height (a depth) of 5 µm. In addition, an aluminum deposited layer is formed on the surface of the extension through direct deposition. The aluminum deposited layer has a thickness of approximately 0.1 µm.

In the same manner as in the first exemplary embodiment, consequently, the mirror finished surface 143 is formed on the smooth surface of the extension 104, and similarly, a band-shaped embossed surface is formed in a region of the extension 104 in which band-shaped concavo-convex portions are formed and the semiglossy surface 144 is thus formed. In particular, a lower peripheral region of internal peripheral surfaces of the sleeve openings 141 and 142 is provided with the semiglossy surface 144 having a grid-like pattern in which wide semiglossy surfaces having a thin mirror finished surface interposed therebetween are formed like a grid. The extension 104 is exposed to a front side of the headlamp HL1 through the front cover 112, and at the same time, the mirror finished surface 143 and the semiglossy surface 144 in the extension 104 are also exposed When an observation is carried out from the front side in the non-lighting of the headlamp HL1, accordingly, the extension 104 having most parts formed as the mirror finished surface 143 and a part formed as the semiglossy surface 144 is observed through the front cover 112. As compared with the case in which the extension 104 is constituted by only a simple mirror finished surface, consequently, a semiglossy surface designed to have a proper area is present so that a sense of gloss for the whole extension can be suppressed and a sense of high quality can be obtained when the lamp is seen in the non-lighting condition.

Also in the second exemplary embodiment, by simply using the resin containing the filler having a size smaller than the wavelength of the visible light in the crystalline resin as the resin constituting the extension to form the aluminum deposited layer through the direct deposition on the surface of the molded resin member, it is possible to form a part of the surface as the mirror finished surface and the other part of the surface as the semiglossy surface. Consequently, it is possible to manufacture an extension having an excellent designing property and to constitute a lamp having a sense of high quality. Therefore, there is not required a step of smoothing a part of the surface after carrying out molding as in the related art and a step of forming concavo-convex portions in a part of the surface. Consequently, it is possible to manufacture a lamp requiring low cost and labor.

While the semiglossy surface is formed in a part of the reflector in the first exemplary embodiment and the semiglossy surface is formed in a part of the extension in the second exemplary embodiment, the semiglossy surface may be formed on either or both of the reflector and the extension in a lamp in which they are provided as in the first exemplary embodiment. In the case of an application to the extension, moreover, a whole surface or most parts thereof may be formed as the semiglossy surface.

Although the embossed surface constituting the semiglossy surface is formed as the band-shaped embossed surface in the first and second exemplary embodiments, it may be formed as an embossed surface having dot-like concavo-convex portions or an embossed surface constituted by concavo-convex portions taking irregular shapes.

The present invention is not restricted to the headlamps according to the first and second exemplary embodiments but it is also possible to apply a lamp comprising components of a lighting device in which a resin is molded to form an aluminum deposited layer on a surface, for example, a reflector and an extension and having a structure in which the surfaces of the components of the lighting device are observed from an outside of the lamp in the same manner.

While the present invention has been described with respect to a limited number of exemplary embodiments, those skilled in the art, having benefit of this disclosure, will appreciate that other exemplary embodiments can be devised which do not depart from the scope of the present invention as disclosed herein. Accordingly, the scope of the present invention should be limited only by the attached claims.

What is claimed is:

1. A lighting device for a vehicle comprising:
   a component including a resin member and an aluminum deposited layer formed on a surface of the resin member,
   wherein the resin member is molded by a resin obtained by adding a filler to a crystalline resin, the filler having a size smaller than 400 nm,
   a surface of the resin layer includes a plurality of smooth surface portions and a plurality of diffusive surface portions having fine protrusions, provided alternatively, the aluminum deposited layer is directly deposited on the surface of the resin member, and each of the smooth surface portions is formed as a mirror finished surface and each of the diffusive surface portions is formed as a semiglossy surface.

2. The lighting device according to claim 1, further comprising:
   a lighting device body, within which the component is provided,
   wherein the component is a reflector, at least an effective reflecting plane of the reflector is formed by a mirror finished surface, and a residual region of the reflector includes a semiglossy surface.

3. The lighting device according to claim 1, further comprising:
   a lighting device body, within which the component is provided,
   wherein the component is an extension, and at least a part of the extension includes a semiglossy surface.

4. The lighting device according to claim 1, wherein each of the diffusive surface portions is wider than each of the smooth surface portions.

5. A method of manufacturing a lighting device for a vehicle including a component with a resin member in which an aluminum deposited layer is formed on a surface of the resin member, said method comprising steps of:
   molding the resin member such that a surface of the resin member includes a plurality of smooth surfaces and a plurality of diffusive surfaces having fine protrusions, provided alternatively, by adding a filler to a crystalline resin, the filler having a size smaller than 400 nm; and
   directly forming the aluminum deposited layer on the surface of the resin member.

6. The method of manufacturing a lighting device according to claim 5, wherein the fine protrusions have a height of 5 to 10 μm.

7. The method according to claim 5, wherein each of the diffusive surface portions is wider than each of the smooth surface portions.

8. A lighting device for a vehicle comprising:
   a component including a resin member and an aluminum deposited layer directly formed on a surface of the resin member,
   wherein the resin member is formed by a crystalline resin with a filler, the filler having a size smaller than 400 nm, and the resin member includes a plurality of smooth surfaces and a plurality of diffusive surfaces having fine protrusions, provided alternatively,
   wherein the component has a mirror finished surface formed on the smooth surface of the resin member, and a semiglossy surface formed on the diffusive surfaces having fine protrusions.

9. The lighting device according to claim 8, wherein the fine protrusions have a height of 5 to 10 μm.

10. The lighting device according to claim 8, wherein each of the diffusive surface portions is wider than each of the smooth surface portions.

* * * * *